May 6, 1969  A. R. BRAUN  3,443,005
PLURAL PART MOLDING
Filed Oct. 24, 1965

INVENTOR
ARTHUR R. BRAUN
BY Dominik & Stein
ATTYS.

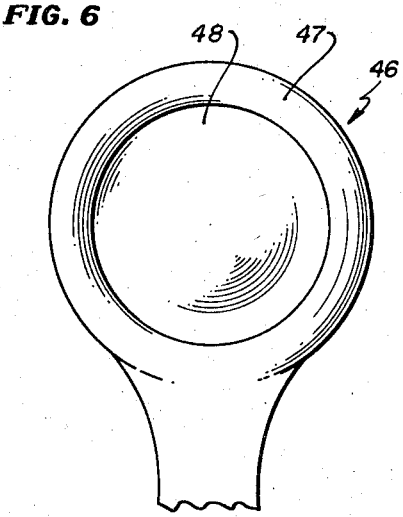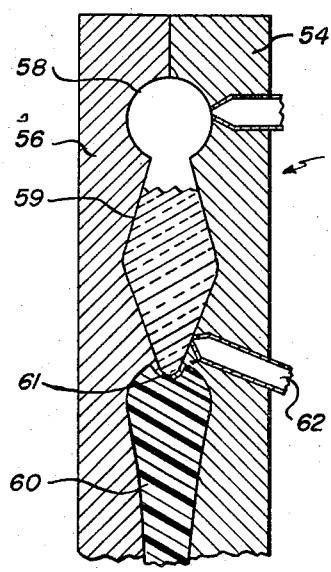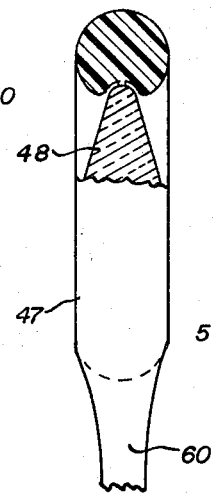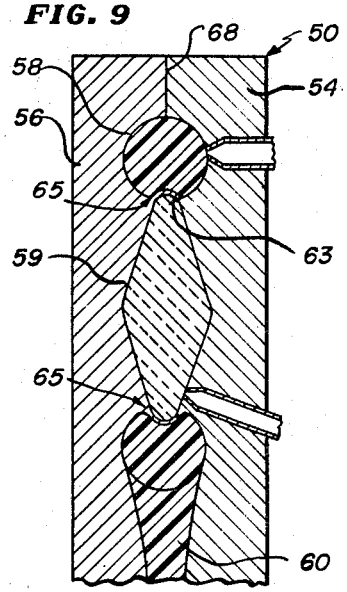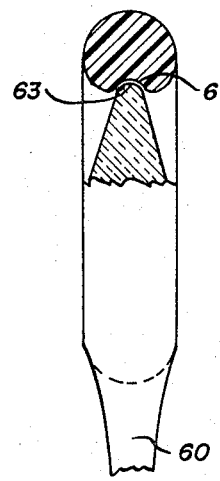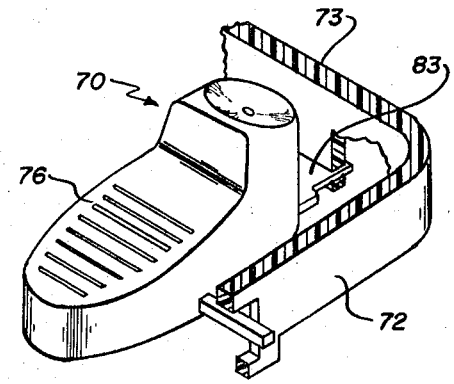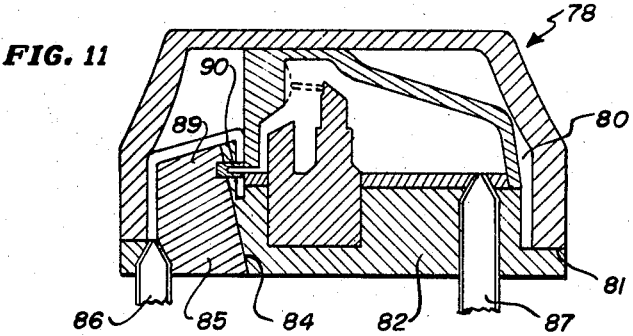

United States Patent Office 3,443,005
Patented May 6, 1969

3,443,005
PLURAL PART MOLDING
Arthur R. Braun, 209 E. Mildred,
Cary, Ill. 60013
Filed Oct. 24, 1965, Ser. No. 504,615
Int. Cl. B29c 9/00
U.S. Cl. 264—245                            3 Claims

ABSTRACT OF THE DISCLOSURE

Molding apparatus and method for making a plastic article formed of plural parts wherein a mold cavity is partitioned into cavities for said plural parts and plastic is injected into each of said cavities.

---

Ths invention relates to a method and apparatus for simultaneously or sequentially molding an article formed of plural parts using different colored plastic, or plastic of different types.

In the past, articles formed of plural parts have been molded as individual components which are then assembled. This method of forming parts with subsequent assembly has been the only satisfactory method for molding a plural part. Obviously, extra handling is required with such a method. Since the cost of labor is currently high and getting higher, and since handling increases the possibilities of breakage and errors in assembly, this method is not entirely satisfactory.

Therefore, an object of the present invention is to provide methods and apparati for simultaneously, or sequentially, molding an article formed of plural parts. In this respect, it is contemplated that the methods and apparatus be applicable to injection molding.

Another object is to provide methods and apparatus for simultaneously, or sequentially, molding an article formed of plural parts using differently colored plastic.

Still another object is to provide methods and apparatus of the above character, wherein plastic of different types may be used.

A further object is to provide methods and apparatus, of the above character, wherein fusing of the differently colored plastic, or the different types of plastic, is substantially reduced, if not entirely eliminated.

It has now been found in accordance with said objects, that a plural part plastic article may be molded by utilizing a flow restriction means between the parts which make up the article, such as a thin web between the interacting molded parts or a restricted orifice(s). More particularly, if the mold design is made with a thin web or a restricted orifice(s) between the cavities that form the plural part article and each cavity is fed with plastic through its own gate, an article may be molded consisting of a plurality of parts, such as a box with a hinged cover, a two-part aerosol valve actuator and many other items.

Other objects of the invention will in part be obvious and will in part appear hereinafter.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIGURE 6 is a perspective view of a magnifying glass, molded in accordance with the present invention;

FIGURE 7 is a cross-sectional view of one embodiment of a mold used to form the magnifying glass of FIG. 6.

FIGURE 8 is a cross-sectional view of the finished magnifying glass molded in the apparatus of FIG. 7.

FIGURE 9 is a cross-sectional view of another embodiment of a mold used to form the magnifying glass.

FIGURE 10 is a cross-sectional view of the finished magnifying glass molded in the apparatus of FIG. 9.

FIGURE 11 is a partial-sectional side view of a mold for molding en aerosol valve actuator in accordance with the present invention; and FIGURE 12 is a perspective view of the fingerpiece and its connection to the wall of the actuator molded in the apparatus of FIG. 11.

Similar reference characters refer to similar parts throughout the several views of the drawings.

Figure 1:
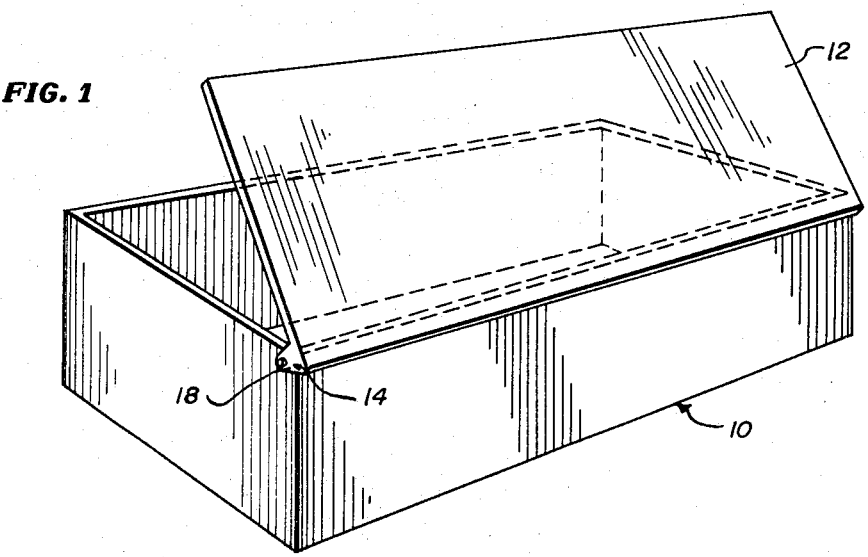
FIGURE 1 is a perspective view of a box with a hinged cover which can be molded as a plural part in accordance with the present invention.

Referring now to the drawings, and particularly to FIGS. 1–5, there is shown a box 10 of rectangular shape having a cover or lid 12 hinged thereto, by means of hinges 14 (only one shown). As explained more fully hereinafter, the box 10 and the lid 12 can be molded simultaneously, or sequentially, of plastic of different color, or of different type, in assembled condition. In other words, the plural part box is molded as an assembled unit.

Figure 2:
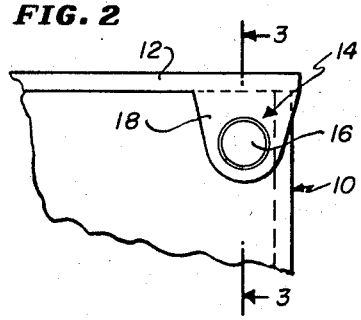
FIGURE 2 is a partial side view of the box of FIG. 1, illustrating the hinge construction.
Figure 3:
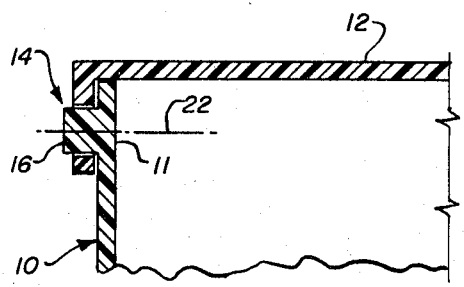
FIGURE 3 is a cross-sectional view of the box of FIG. 1, taken along lines 3—3.
Figure 5:
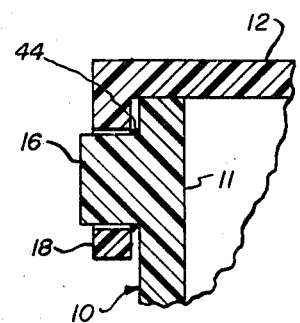
FIGURE 5 is a partial-sectional view of the hinge formed with the mold of FIG. 4.

The hinge 14, as can be best seen in FIGS. 2, 3, and 5 comprises a pivot pin 16 integral with the wall 11 of box 10 and a depending flange 18 integral with the cover 12 and apertured to receive the pivot pin 16. The flange is spaced from side wall 11 of the box 10.

Figure 4:
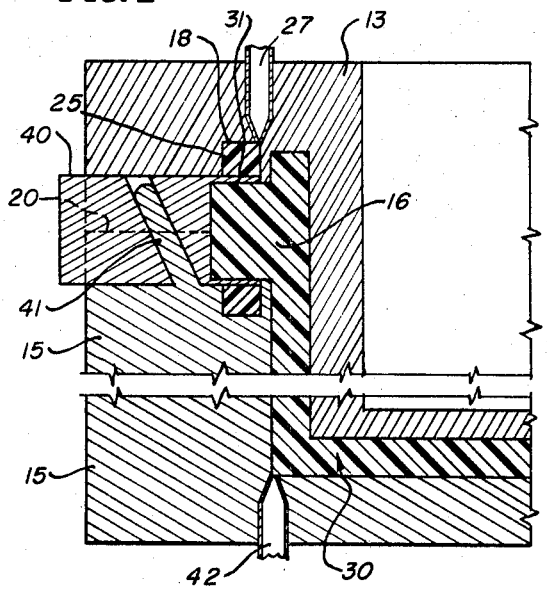
FIGURE 4 is a partial-sectional view of a mold, along line 3—3 of the article of FIG. 3, illustrating how the two components of the plural part article, in this case the box of FIG. 1, are molded simultaneously.

The mold for the box is shown in FIG. 4. It comprises an interior box-lid mold 13 and an exterior box-lid mold 15. The parting line of the mold divides the pivot pin 16, as indicated by the line 20 in FIG. 4 and divides the flange 18, as indicated by the line 22 in FIG. 3. The lid 12 is formed in open position, parallel to the front side wall as seen in FIG. 1 of the box. The mold elements have a common circular-shaped web 40 which encloses pivot pin cavity 31 and extends outwardly (to the left). This web is shifted laterally by pin 41 or other means as the mold is opened. Such use of a web permits the box and the lid to be molded simultaneously, or sequentially, with little, if any, fusing of color, or materials.

Referring now to FIG. 4, molten or fluid plastic of one color, or of one type, is injected into the mold cavity 25 via injection nozzle 27, to form the flange 18 and cover 12 while plastic of the same or another color or type is injected into the mold cavity 30 via injection nozzle 42, to form the box and pivot pin 16. The plastic injected into the cavity 25 and the cavity 30, respectively, are prevented from flowing into the other cavity by the web 40.

After the plastic solidifies, the mold is opened. In so opening the mold, there is a separation at line 20 of the two elements along with a withdrawal of the common circular-shaped web 40 from about the pivot pin 16. Thus, the box and lid are molded in assembled condition avoiding expensive hand or machine assembly.

If, during the injection, web 40 should be displaced, a small amount of flashing 44 may result, but this would not be objectionable since the flashing is easily broken upon closing or manipulating the lid 12. This is seen in FIG. 5, where flashing 44 is shown to have occurred, due to the webs 40 having been displaced during molding.

In FIGS. 6-10 there is illustrated a magnifying glass 46 having a frame 47 of one type plastic and a lens 48 of another type plastic. Several embodiments of mold apparatus is also shown. A handle 51 may be attached to the frame 47.

In the embodiment of apparatus shown in FIGS. 8 and 9, the mold 50 comprises two halves 54 and 56, each of which has a cavity formed therein which together form a substantially ring-shaped frame and handle cavity 58, an elliptical-shaped lens cavity 59, and a handle cavity 60 when the mold halves 54 and 56 are closed. The two cavities communicate with each other by a series of restricted orifices 61, spaced about the periphery of the lens, whereby the lens 48 is retained within frame 47.

The lens 48 may be formed of a clear plastic such as methyl methacrylate, which is injected into the lens cavity 59 through an injection nozzle 62, and the frame 47 and handle 51 may be formed of a colored plastic such as polyethylene, polypropylene, ethyl cellulose and the like. As in the above described example, these two materials are injected simultaneously into the respective cavities 58 and 59. They are prevented from fusing by the restricted orifice 61. In this respect, however, it should be noted that the injection pressure used to fill each cavity is substantially equal so that there is little, if any, leakage through the restricted orifices 61. Usually the pressures employed are within plus or minus 50% of each other. After the two types of plastic have solidified, the mold 50 can be opened.

FIGS. 9 and 10 illustrate a variation of the mold for making the magnifying glass of FIG. 6. As seen, the mold half 56 contains a series of webs 65 or even a completely annular web which separates the frame cavity 58 from the lens cavity 59 when the mold is closed. The web extends past the parting line 68 into a mating shaped recess.

Upon opening the mold, the web retracts with mold half 56. Its flexibility permits it to release and bend in a nonlinear fashion as it is being removed whereby a lens edge 63 may be formed which protrudes into annular lens edge cavity 64 of the frame 58. With such provision, it may be noted that the lens 48 will be fixedly secured within the frame 47 but will be free to shift therein.

In FIGS. 11 and 12 there is illustrated a two piece actuator 70 for an aerosol valve which may be molded of plastic of different color or of different type. The actuator shown has a tubular support wall 72 with an interior pivot wall 73 and a fingerpiece 76 with a lever tab 83 extending forwardly and pivoting about the undersurface of wall 73.

The mold 78 for molding the actuator 70 is shown in FIG 11. It comprises two mold elements with a mold cavity 80 formed between them. The parting line of the mold is at 81. The male half 82 of the mold is split as at 84 whereby a portion of it acts as the knockout pin for the molded article.

Knockout pin portion 85 has two webs 89 and 90 which extend toward the fingerpiece cavity on top of and below the lever tab 83.

Injection nozzles 86 and 87 inject plastic into the cavity 80, but because of webs 89 and 90, they prevent the plastic from one nozzle to mix with the other nozzle. Hence, different colored, or types, of plastic may be injected simultaneously or sequentially, to form the actuator, which when molded is of two parts, the tubular support wall 72 and the fingerpiece 76.

In opening the mold of FIGS. 11 and 12, the upper (as seen in FIG. 12) element, first is removed. Then, the knockout pin portion 85 moves upwardly (as seen in FIG. 12) to release the finished actuator. With such upward movement, webs 89 and 90 are removed from about the lever tab 83. The result is an assembled two piece actuator, ready for immediate placement upon the valve stem of an aerosol valve.

From the above description it can be seen that plural parts can be molded simultaneously or sequentially using different colored plastic, or plastic of different types, by providing web inserts or restricted orifices at appropriate positions within the mold cavities to prevent the materials from fusing. Also, these webs are easily removed upon opening the mold so that the molded plural parts can be removed with little, if any, difficulty. In this respect, if the webs are formed as an integral part of a portion of the mold halves, the webs should be sufficiently resilient so that they may flex and be easily removed upon opening the mold. The mold can also be formed in individually removable sections which are sequentially parted or removed, allowing the webs to be removed.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

Now that the invention has been described, what is claimed as new and desired to be secured by Letters Patent is:

1. A molding apparatus for molding a plastic article formed of plural parts comprising, in combination, a split-type mold of a plurality of mold elements which, in closed relationship, form a cavity thereinbetween, a partition with a restricted orifice in said cavity which divides said cavity into individual cavities for each part of said plural part article, said cavities being interconnected, and separate injection nozzle means for injecting said plastic into each of said individual cavities.

2. The molding apparatus of claim 1, wherein said restricted orifices are disposed at various positions between said cavities.

3. A method for molding a plastic article formed of plural parts of different plastic material in assembled condition comprising the steps of providing a split-type mold which when brought together form a cavity thereinbetween, providing a partition within said cavity to divide said cavity into individual cavities for each part of said plural part article with said partition having a restricted orifice therein to provide communication between said individual cavities but to prevent substantial intermixing of the different plastic materials injected into said individual cavities, injecting plastic on opposite sides of said partition to said plural parts, and opening said split-type mold and withdrawing said partition.

References Cited

UNITED STATES PATENTS

| 2,337,550 | 12/1943 | Crosby | 264—328 X |
| 2,379,971 | 7/1945 | Krehbiel. | |
| 3,051,994 | 9/1962 | Carozzo | 264—245 X |
| 3,104,425 | 9/1963 | Crane et al. | 264—318 X |
| 3,206,992 | 9/1965 | Ferdig | 264—242 X |
| 3,333,299 | 8/1967 | Florjancic | 264—242 X |

FOREIGN PATENTS 629,332  12/1961  Italy.

ROBERT F. WHITE, *Primary Examiner.*

T. J. CARVIS, *Assistant Examiner.*

U.S. Cl. X.R.

18—30; 249—130; 264—242, 250, 328